United States Patent
Thangarajan et al.

(10) Patent No.: US 11,936,712 B1
(45) Date of Patent: Mar. 19, 2024

(54) PACKET-ACCURATE TARGETED CONTENT SUBSTITUTION

(71) Applicant: Synamedia Limited, Staines Upon Thames (GB)

(72) Inventors: Thiravia Pandiyan Thangarajan, Bangalore (IN); Karthikeyan Vaithiyanathan, Tamil Nadu (IN); Vinose Thilak Adaikalam, Tamil Nadu (IN); Pravin Chenthil Kumar, Tamil Nadu (IN); Aswin Velusamy, Karnataka (IN); Ganesankumar Annamalai, Karnataka (IN); Latha Ramaiah, Karnataka (IN); Salik Miah, Hampshire (GB); Reuven Nimrod, Mevaseret Zion (IL); Ian John Bastable, Hampshire (GB)

(73) Assignee: Synamedia Limited, Staines Upon Thames (GB)

( * ) Notice: Subject to any disclaimer, the term of this patent is extended or adjusted under 35 U.S.C. 154(b) by 0 days.

(21) Appl. No.: 18/208,678

(22) Filed: Jun. 12, 2023

(30) Foreign Application Priority Data

Apr. 6, 2023 (IN) .............................. 202341026129

(51) Int. Cl.
*H04L 65/75* (2022.01)
*H04L 65/611* (2022.01)

(52) U.S. Cl.
CPC .......... *H04L 65/764* (2022.05); *H04L 65/611* (2022.05)

(58) Field of Classification Search
None
See application file for complete search history.

(56) References Cited

U.S. PATENT DOCUMENTS

| 5,917,830 | A  | * | 6/1999 | Chen | H04N 21/812 |
| | | | | | 348/E7.063 |
| 6,505,169 | B1 | * | 1/2003 | Bhagavath | G06Q 30/0277 |
| | | | | | 709/219 |
| 6,567,471 | B1 | * | 5/2003 | Yoshinari | H04N 19/40 |
| | | | | | 375/E7.181 |
| 6,615,039 | B1 | * | 9/2003 | Eldering | H04N 21/8455 |
| | | | | | 455/418 |
| 7,802,277 | B2 | * | 9/2010 | Medford | H04N 21/8455 |
| | | | | | 380/240 |
| 7,912,217 | B2 | * | 3/2011 | Baugher | H04N 21/4405 |
| | | | | | 380/42 |

(Continued)

*Primary Examiner* — Backhean Tiv

(74) *Attorney, Agent, or Firm* — Fernando & Partners, LLP

(57) ABSTRACT

Techniques for packet-accurate targeted content substitution by a stitcher are described herein. In some embodiments, the stitcher at a client device receives a live transport stream (TS) and a splice message indicating a start time and an end time of a splice period. The stitcher locates in the live TS a video packet with a video packet identifier (PID) and an audio packet with an audio PID crossing the start time. The stitcher injects to the live TS targeted content TS packets within the splice period, where the injection includes re-stamping PIDs and presentation timestamps of the targeted content TS packets to match the live TS packets, and re-stamping the live TS packets with a predefined PID starting from the video packet and the audio packet, and ceasing the re-stamping when a respective audio packet in the live TS packets crossing the end time.

20 Claims, 10 Drawing Sheets

(56) References Cited

U.S. PATENT DOCUMENTS

| | | | | |
|---|---|---|---|---|
| 8,910,197 | B2* | 12/2014 | Acharya | H04L 12/1868 |
| | | | | 725/35 |
| 8,935,720 | B1* | 1/2015 | Bertz | H04N 21/23424 |
| | | | | 725/35 |
| 9,197,907 | B2* | 11/2015 | Phillips | H04N 21/2668 |
| 9,301,020 | B2* | 3/2016 | Sun | H04N 21/8456 |
| 9,628,531 | B2* | 4/2017 | Giladi | H04L 65/764 |
| 9,787,751 | B2* | 10/2017 | Hosur | H04L 65/65 |
| 10,373,196 | B2* | 8/2019 | Ma | G06Q 30/0251 |
| 10,771,857 | B2* | 9/2020 | Bafekr | H04N 21/812 |
| 10,873,774 | B2* | 12/2020 | Loheide | H04L 65/80 |
| 11,038,932 | B2* | 6/2021 | Loheide | H04L 65/70 |
| 11,038,938 | B2* | 6/2021 | Chen | H04L 65/612 |
| 11,051,061 | B2* | 6/2021 | Loheide | H04N 21/8456 |
| 11,082,724 | B2* | 8/2021 | Estus | H04N 21/23424 |
| 2006/0093045 | A1* | 5/2006 | Anderson | H04N 21/44016 |
| | | | | 375/240.26 |
| 2009/0013347 | A1* | 1/2009 | Ahanger | H04N 21/23424 |
| | | | | 725/36 |
| 2009/0276312 | A1* | 11/2009 | Feng | G06Q 30/0254 |
| | | | | 707/999.1 |
| 2010/0189131 | A1* | 7/2010 | Branam | H04N 21/44016 |
| | | | | 375/E7.026 |
| 2010/0325658 | A1* | 12/2010 | Schlack | H04N 21/23424 |
| | | | | 725/32 |
| 2021/0211750 | A1* | 7/2021 | Loheide | H04N 21/8456 |

\* cited by examiner

600

---

(A)  ~641

Detecting the video packet and the audio packet in the stream crossing the start time of the splice period includes detecting a video PTS of the video packet crossing the start time; and re-stamping the second set of TS packets includes re-stamping PIDs of video packets in the second set of TS packets to the video PID and re-stamping presentation timestamps of the video packets continuous to the video PTS of the video packet without re-stamping the audio packets in the second set of TS packets

---

(B)  ~642

Detecting the video packet and the audio packet in the stream crossing the start time of the splice period includes detecting an audio PTS of the audio packet crossing the start time; and re-stamping the second set of TS packets includes re-stamping PIDs of audio packets in the second set of TS packets to the audio PID and re-stamping presentation timestamps of the audio packets continuous to the audio PTS of the audio packet

---

(C)  ~643

Ceasing to re-stamp the first set of TS packets and the second set of TS packets includes: detecting a respective video TS packet in the first set of TS packets crossing the end time; and in response to detecting the respective video TS packet crossing the end time, ceasing to re-stamp video packets in the first set of TS packets to the predefined PID after the respective video TS packet while continuing to re-stamp one or more audio packets in the first set of TS packets to the predefined PID

---

(D)  ~644

Ceasing to re-stamp the first set of TS packets and the second set of TS packets includes: detecting the respective audio packet in the first set of TS packets crossing the end time; and in response to detecting the respective audio TS packet crossing the end time, ceasing to re-stamp audio packets in the first set of TS packets to the predefined PID after the respective audio TS packet and ceasing to inject the second set of TS packets to the stream

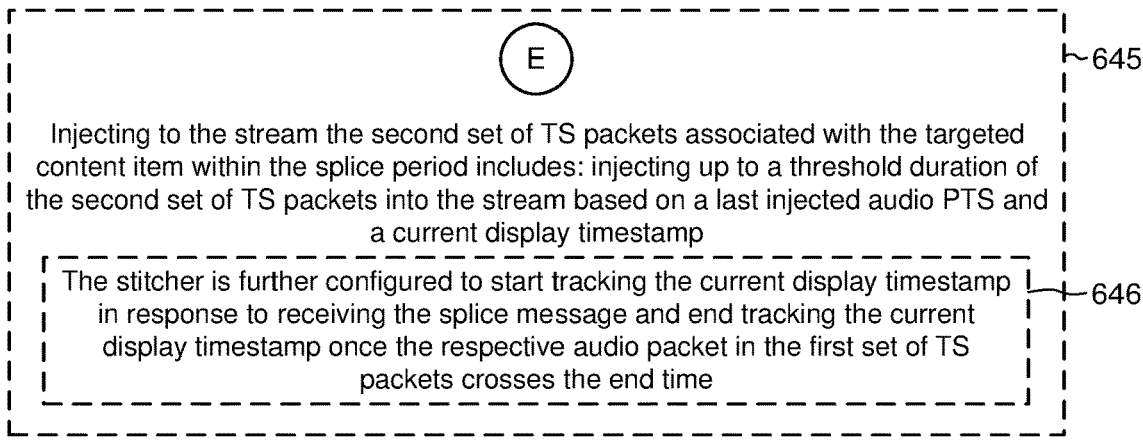

― 645

Injecting to the stream the second set of TS packets associated with the targeted content item within the splice period includes: injecting up to a threshold duration of the second set of TS packets into the stream based on a last injected audio PTS and a current display timestamp

― 646

The stitcher is further configured to start tracking the current display timestamp in response to receiving the splice message and end tracking the current display timestamp once the respective audio packet in the first set of TS packets crosses the end time

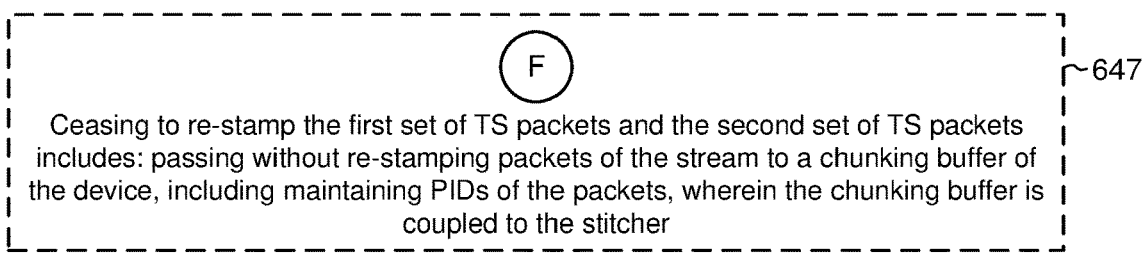

― 647

Ceasing to re-stamp the first set of TS packets and the second set of TS packets includes: passing without re-stamping packets of the stream to a chunking buffer of the device, including maintaining PIDs of the packets, wherein the chunking buffer is coupled to the stitcher

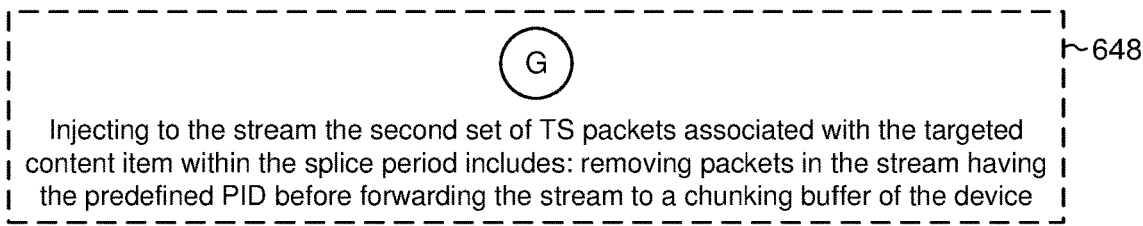

― 648

Injecting to the stream the second set of TS packets associated with the targeted content item within the splice period includes: removing packets in the stream having the predefined PID before forwarding the stream to a chunking buffer of the device

Figure 6C

PACKET-ACCURATE TARGETED CONTENT SUBSTITUTION

CROSS-REFERENCE TO RELATED APPLICATION

This application claims the benefit of priority from Indian Patent Application No. 202341026129, filed on Apr. 6, 2023, the contents of which are hereby incorporated by reference.

TECHNICAL FIELD

The present disclosure relates generally to multimedia content delivery and, more specifically, to substituting targeted content with packet level accuracy.

BACKGROUND

Some previously existing set-top-box (STB) targeting advertisement solutions require special hardware (e.g., an elementary stream processor) to enable advertisement stitching with live content, while others use a dedicated decoder for blending the live content with advertisements during the transition. The additional hardware components and/or dedicated decoder in such solutions add to the cost of content delivery. Further, when substituting advertisements, hardware based elementary stream processing is prone to dropping video and/or audio packets. As such, without an accurate transition point, when switching to the advertisements, e.g., using channel changes, previously existing solutions often result in negative user experiences such as freezing during the transition.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIGS. 6A-6C are flowcharts illustrating a packet-accurate targeted content substitution method, in accordance with some embodiments.

Figure 1:
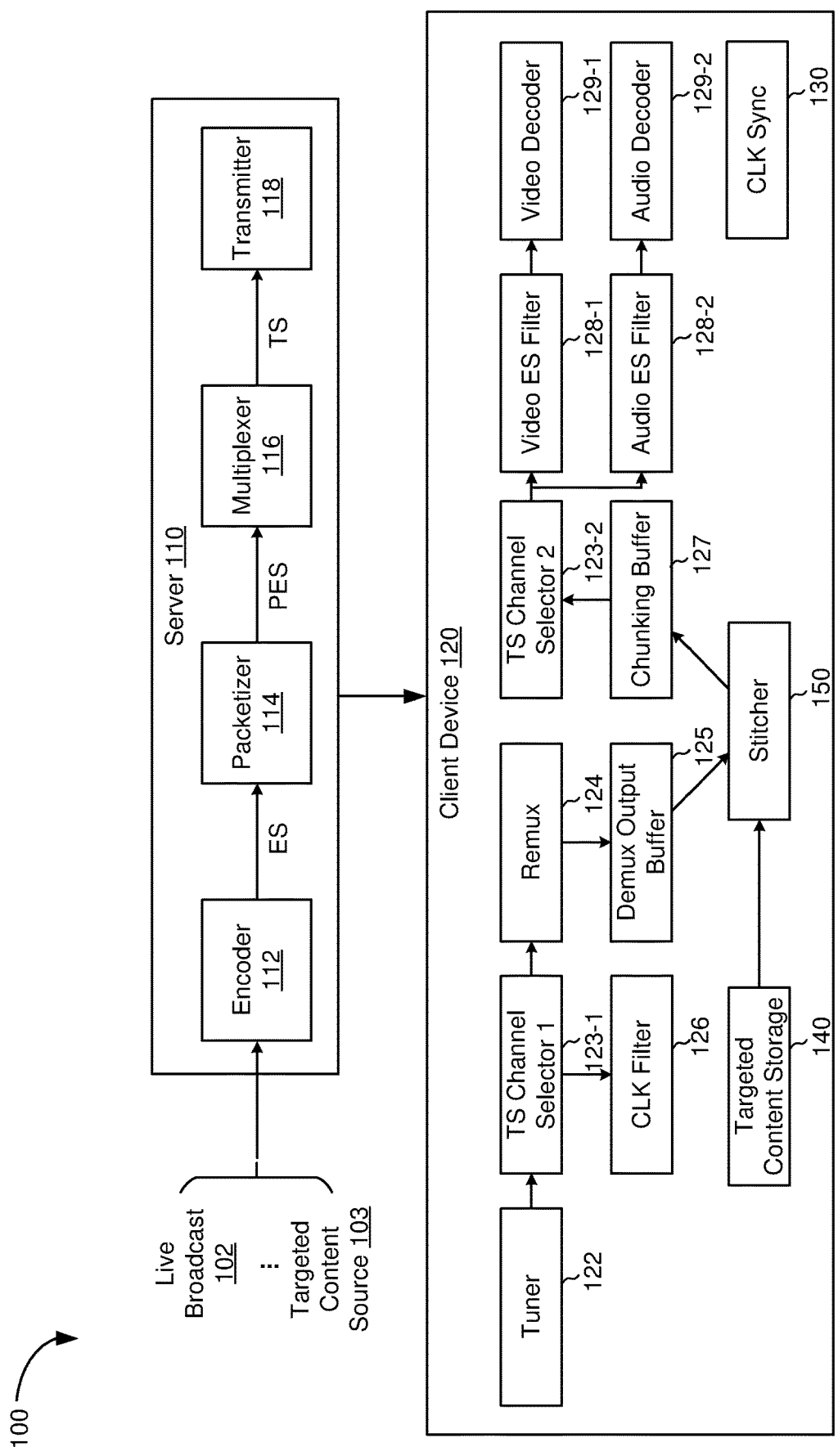
FIG. 1 is a block diagram of an exemplary multimedia content delivery system including a stitcher on a client device for packet-accurate targeted content substitution, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Seamless targeted content substitution techniques described herein use standard recording devices to view live content, locate exact transition points in live transport streams (TS), and replace the live content with the targeted content TS at the exact transition points. In some embodiments, the stitching of the targeted content happens separately for audio and video packets to achieve packet level accuracy. Because standard recording devices for viewing live content are used, e.g., devices capable of re-multiplexing and chunking input, the techniques described herein can be applied across any type of platform and middleware without the additional cost of hardware upgrades. Further, the techniques described herein improve the efficiency of targeted content substitution because minimal elementary stream processing is required. Even for low-cost STBs with a single decoder, high resolution advertisement substitution (e.g., 4K) is possible. In addition, for existing STBs that have a separate decoder, because the start and end of a splice period are aligned with group-of-pictures (GOP), signaling any discontinuity to decoders is unnecessary. Accordingly, the methods, devices, and systems described herein enable efficient, accurate, and seamless transitions between live content and targeted content without cost increases on the client side.

In accordance with various embodiments, a packet-accurate targeted content substitution method is performed at a stitcher of a device, where the device further includes a tuner and a re-multiplexer. The method includes receiving from the re-multiplexer, while the tuner is tuned to receive a stream carrying a first set of transport stream (TS) packets, a splice message indicating a start time and an end time of a splice period. The method further includes in response to receiving the splice message, locating in the stream a video packet and an audio packet crossing the start time of the splice period, where the video packet is associated with a video packet identifier (PID) and the audio packet is associated with an audio PID. The method additionally includes injecting to the stream a second set of TS packets associated with a targeted content item within the splice period, including re-stamping the second set of TS packets with a respective one of the video PID and the audio PID and with corresponding timestamps of the first set of TS packets, and re-stamping the first set of TS packets with a predefined PID starting from the video packet and the audio packet, and ceasing to re-stamp the first set of TS packets and the second set of TS packets when a respective audio packet in the first set of TS packets crosses the end time.

EXAMPLE EMBODIMENTS

Methods, devices, and systems in accordance with various embodiments described herein provide packet-accurate targeted content substitution. As described above, previously existing frame level targeted content substitution (also referred to hereinafter as "splicing") often experience packet drops and have poor user experience when transitioning into targeted content or returning to viewing live events. Using packet-accurate targeted content substitution methods described herein, a stitcher re-stamps presentation timestamps of targeted content packets to ensure the content streaming continuity when transitioning into the display of the targeted content and ceases the re-stamping when transitioning out of the display of the targeted content. Without any packet drops, the packet-accurate targeted content substitution described herein provides a seamless transition between live content and targeted content.

Reference is now made to FIG. 1, which is a block diagram of an exemplary multimedia content delivery system 100 in accordance with some embodiments. In some embodiments, the system 100 includes a server 110 (e.g., including one or more servers) and at least one client device 120. In some embodiments, the server 110 includes an encoder 112, which encodes one or more multimedia content items to elementary stream(s) (ES), e.g., encoding multimedia content from a content storage (not shown), a live broadcast source 102, and/or a targeted content source 103. The elementary stream(s) are then packetized by a packetizer 114 to generate packetized elementary stream(s) (PES) before being multiplexed by a multiplexer 116 into transport stream(s) (TS) for transmission by a transmitter 118. As used herein, a TS is also referred to as a stream. Likewise, a TS packet is also referred to hereinafter as a packet. In some embodiments, the transmitter 118 modulates a radio frequency (RF) carrier based on the transport stream(s) (referred to herein after as the live TS) and transmits the modulated carrier via satellite transponders (not shown).

As used herein, a multimedia content item (also referred to as "a media content item", "a content item", "media content" or "content") includes suitable data of various formats, for example, videos, audio data, text, and/or metadata, etc. In some embodiments, the content item prior to feeding to the encoder 112 is clear (e.g., raw content without being compressed), thus allowing the server 110 to reuse, encode, re-encode, and/or package the content item in different formats. Although FIG. 1 illustrates packaging and transmitting the transport stream(s) 117, the encoding, packaging, decoding, and/or re-encoding processes are not limited to MPEG-2 protocol. A variety of audio and video streaming formats can be encoded, packaged, transmitted, and/or decoded such as advanced video encoding (AVC), versatile video coding (VVC), high efficiency video coding (HEVC), AOMedia video 1 (AV1), VP9, MPEG-2, MPEG-4, MP3, AC-3, etc.

Also as used herein, "targeted content" (also referred to hereinafter as "a targeted content item") is one type of media content created and tailored for a targeted audience with the goal of driving a specific response from the targeted audience. Advertisements are one type of targeted content. When an advertisement is shown to a group of users that is identified as the targeted audience of the advertisement, the group of users would most likely find the advertisement appealing and the advertisement is likely to prompt the group of users to take actions such as making a purchase, completing a subscription, and/or making the users aware of a brand. Targeted content is not limited to advertisements. Other types of targeted content include, but not limited to, alerts, variations of a media content item such as different ending options, etc.

On the client side, an exemplary client device 120 receives broadcasted media content, e.g., receiving a broadcasted live TS. The exemplary client device 120 can be a set-top-box (STB), a personal video recorder (PVR), and/or a TV. Components of the exemplary client device 120 shown in FIG. 1 can be on multiple devices, e.g., an STB/PVR with various components as shown in FIG. 1 coupled to a TV, a TV with various components as shown in FIG. 1, or an STB/PVR with various components as shown in FIG. 1 but having a separate decoder and/or recording storage. In some embodiments, the client device 120 includes a tuner 122 to tune to the transmission frequency of a respective transponder for receiving the live TS and one or more TS channel selectors 123 (e.g., TS channel selector 1 123-1 and TS channel selector 2 123-2) coupled to the tuner 122. The TS channel selector(s) 123 are configured to obtain stream data corresponding to channel(s). Although two separate TS channel selectors 123 are shown in FIG. 1, TS channel selector 1 123-1 and TS channel selector 2 123-2 can be the same or distinct in accordance with various embodiments.

In some embodiments, the client device 120 is capable of recording content and includes recording components such as a re-multiplexer 124 coupled with TS channel selector 1 123-1, a demultiplexer output buffer 125 coupled with the re-multiplexer 124, and a chunking buffer 127 coupled with TS channel selector 2 123-2 to facilitate the recording. In some embodiments, the client device 120 also includes one or more ES filters 128 (e.g., a video ES filter 128-1 and an audio ES filter 128-2) to recover a bitstream and extract a PES, e.g., based on a PES identifier for a service or a program. The client device 120 additionally includes one or more decoders 129 (e.g., a video decoder 129-1 and an audio decoder 129-2) to decode the content for display by the display of the client device 120 or a TV. In some embodiments, when re-multiplexing the TS, a clock filter 126 coupled with TS channel selector 1 123-1 obtains clock reference and communicates the clock reference to a clock synchronizer 130 coupled with the decoder(s) 129 for synchronizing the video and the audio.

In some embodiments, the client device 120 includes a targeted content storage 140 for storing relevant targeted content 103. For example, based on the packet identifier (PID) of transport packets (TPs) in the TS from the server 110 and the signaling of the targeted content delivery service, the client device 120 downloads relevant targeted content from the targeted content source 103 and stores the downloaded targeted content in the targeted content storage 140. For targeted content substitution, in some embodiments, the client device 120 includes a stitcher 150 to obtain the targeted content as a targeted content TS from the targeted content storage 140, injects packets from the targeted content TS to the live TS from the demultiplexer output buffer 125, and places the processed TS to the chunking buffer 126 for further processing by TS channel selector 2 123-2.

As shown in FIG. 1, the solution described herein uses standard recording components in an STB (i.e., the re-multiplexer 124, the demultiplexer output buffer 125, and the chunking buffer 127) for both viewing the live content and for targeted content substitution. As will be described in further detail below, the stitcher 150 locates in the live TS the exact splice points (also referred to hereinafter as the transition points) and replaces the live content with the targeted content within a splice period (also referred hereinafter as a targeted content substitution time slot). Without additional hardware and/or firmware (e.g., additional device drivers), the stitcher 150 described herein performs targeted content splicing efficiently with packet level accuracy to seamlessly transition between live content and targeted content. Further, in some embodiments, because the splice points are aligned with group-of-pictures (GOP) boundaries, for devices that have separate decoders, it is unnecessary to inform the separate decoders of any discontinuity, thus saving the amount of signaling between various components of the client device 120.

Figure 2A:
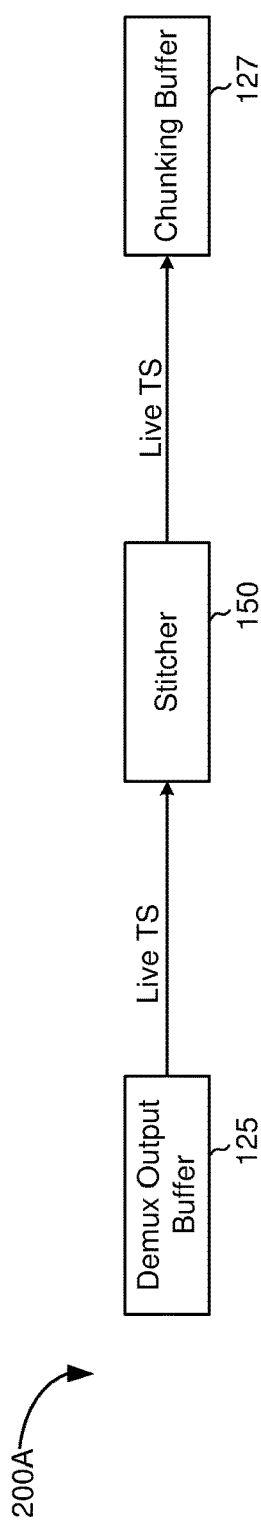
FIGS. 2A and 2B are diagrams illustrating transport stream (TS) processing by the stitcher, in accordance with some embodiments.
Figure 2B:
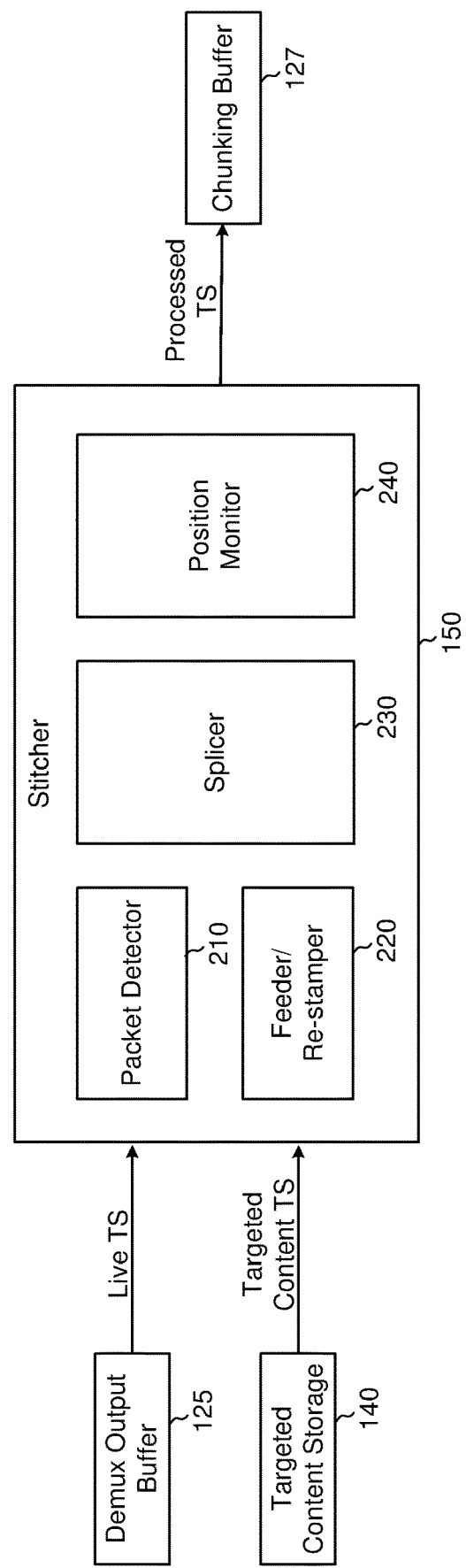

FIGS. 2A and 2B are diagrams 200A and 200B illustrating various embodiments of TS processing by the stitcher 150 (FIG. 1). FIG. 2A illustrates that in a live viewing mode, the stitcher 150 passes the live TS from the demultiplexer output buffer 125 to the chunking buffer 127 for playing back of the live stream. Because there is no live data processing by the stitcher 150, the live data transportation delay is minimal when the data bypasses the stitcher 150. As such, the clock source used by the encoder 112 (FIG. 1) can still be used as program clock reference (PCR) by the clock synchronizer 130 (FIG. 1) for synchronizing the video and audio data at the client device.

FIG. 2B illustrates that to facilitate packet-accurate targeted content substitution, the stitcher 150 further includes a packet detector 210, a feeder and re-stamper module 220, a splicer 230, and a position monitor 240 in accordance with some embodiments. In some embodiments, the position monitor 240 coordinates with the packet detector 210, the feeder and re-stamper module 220, and the splicer 230 to keep track of the current display point, e.g., the current display PTS, during transitions and while the targeted content is being played. In some embodiments, the position monitor 240 tracks the pace of the current display point in order to derive the pace of the targeted content TS packet injection, e.g., injecting less than a threshold duration of the targeted content TS into the live TS based at least in part on a last injected audio PTS form the targeted content TS and the current display PTS. In the case of the pace being too slow or too fast, the position monitor 240 reports to the splicer 230 so that the pace of the injection can be adjusted.

In some embodiments, the splicer 230 receives signaling information that includes the transition points, e.g., a start time and an end time of a splice period. Upon receiving the signaling information, the splicer 230 notifies the packet detector 210 to monitor the demultiplexer output buffer 125 (e.g., packets from the re-multiplexer 124, FIG. 1). While monitoring the packets from the live TS, the packet detector 210 notifies the splicer 230 and/or the feeder and re-stamper module 220 to start or stop injecting the targeted content once packets are detected crossing the transition points. In some embodiments, the packet detector 210 switches to an idle state, e.g., stop packet detection, once the transition point(s) have been reached. Moreover, once transitioning out of the splice period, e.g., resuming viewing of the live TS, as described above with reference to FIG. 2A, the packet detector 210 as well as other components of the stitcher 150 are idle when in the live viewing mode. In some embodiments, the packet detector 210 also validates transition points, e.g., by comparing the current live position with the transition points prior to activating the packet detection. In the case of the transition points being invalid, e.g., too far out or already passed, the packet detector 210 reports the error to the splicer 230.

In some embodiments, when transitioning into the splice period, the splicer 230 is configured to seamlessly replace the packets from the live TS with the packets from the targeted content TS in such a way that the decoders 129 (FIG. 1) are not aware of the packets in the processed TS are from different source(s) when using the packets from the chunking buffer 127 for decoding. In some embodiments, the splicer 230 re-stamps the presentation timestamps and the PIDs of the live TS packets, so that the timestamps in the processed TS are continuous and the PIDs are consistent before, during, and after the packet level targeted content substitution. Similarly, to prepare for the seamless packet level targeted content substitution, the feeder and re-stamper module 220 is configured to re-stamp the presentation timestamps and the PIDs of the packets from the targeted content TS in accordance with some embodiments. Having re-stamped the targeted content TS packets, the feeder and re-stamper module 220 provides the re-stamped packets to the splicer 230 for injection into the live TS in accordance with some embodiments. In some embodiments, the feeder and re-stamper module 220 coordinates with the position monitor 240 to pace the bitrate of the injection to avoid buffer overflow or underflow.

Figure 3:
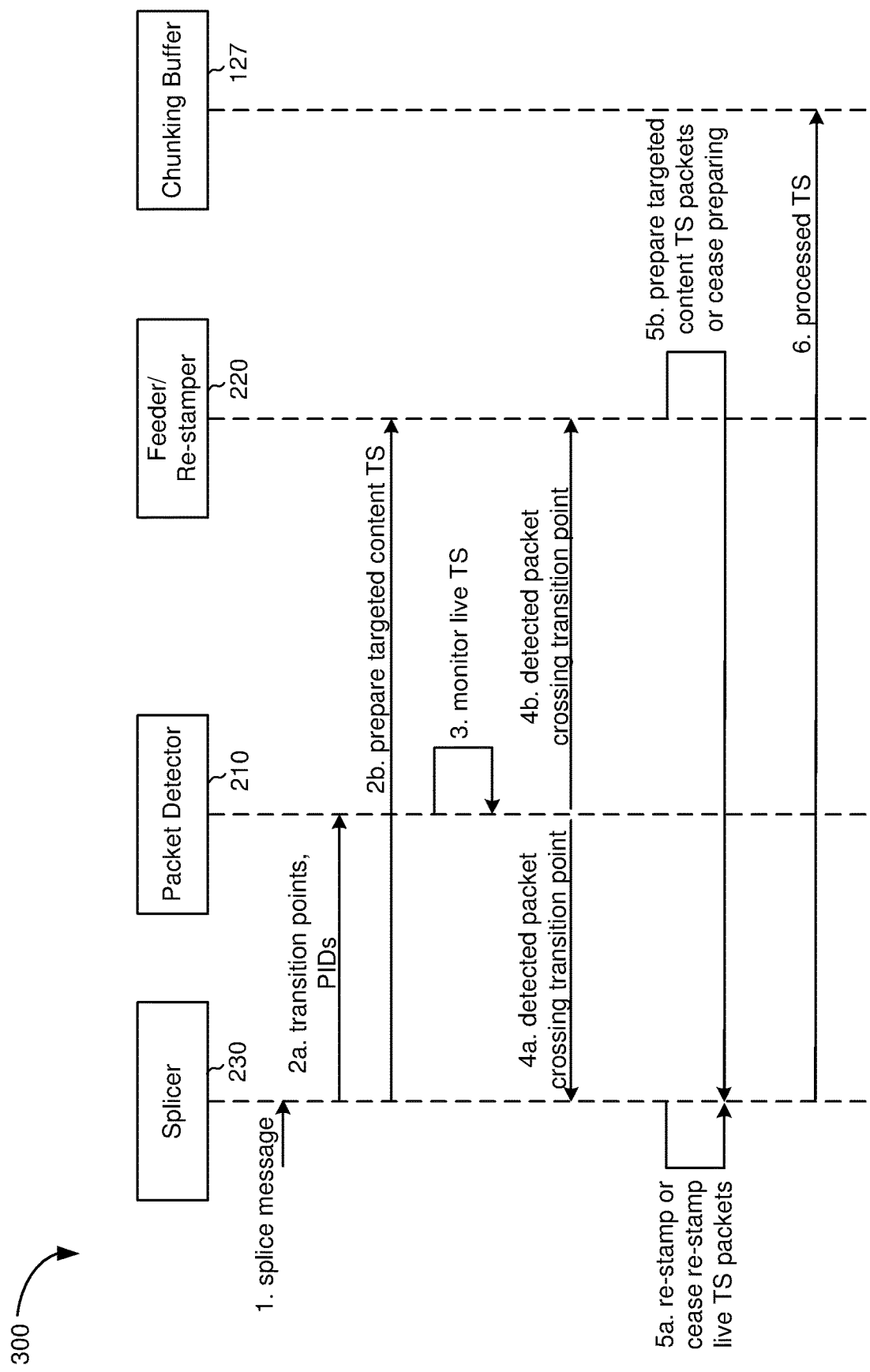
FIG. 3 is a sequence diagram illustrating transitioning between live content and targeted content for packet-accurate targeted content substitution, in accordance with some embodiments.

FIG. 3 is a sequence diagram 300 illustrating transitioning between live content and targeted content for packet-accurate targeted content substitution in accordance with some embodiments. In step 1, the splicer 230 receives one or more splice messages that have information related to targeted content substitution, such as the transition points (e.g., the start and/or end PTS of a splice period) and PIDs of packets for targeted content substitution. In some embodiments, the splice message(s) are encapsulated in packets for signaling, which are multiplexed with the live TS packets. For example, tables in TS packets include signaling information and such tables include, but are not limited to, a program association table (PAT) and a program map table (PMT) as specified according to MPEG standard, an event information table (EIT), a service description table (SDT), and a network information table (NIT) as specified according to the digital video broadcasting (DVB) in the digital video broadcasting—service information (DVB-SI) standard. In some embodiments, the signaling declares the targeted content delivery service for program(s) with certain PIDs, e.g., a video PID and a corresponding audio PID associated with a live TS and/or a video PID and a corresponding audio PID associated with a targeted content TS. According to the splice message, in step 2a, the splicer 230 notifies the packet detector 210 to monitor the live TS to identify packets that cross the transition points and match the PIDs specified in the splice message. Also as soon as the splice message is received, in step 2b, the splicer notifies the feeder and re-stamper 220 to prepare the targeted content TS for the splice period. In some embodiments, the feeder and re-stamper 220 parses the PAT and PMT and selects the video PID and the audio PID of the targeted content to download to the targeted content storage 140 and/or to use for the targeted content substitution.

In response to receiving the notification, in step 3, the packet detector 210 monitors the live TS until the packet detector 210 detects packet(s) crossing the transition points. As is known in the art, broadcasters routinely transmit video packets ahead of the corresponding audio packets, e.g., typically by one or more seconds. As such, in some embodiments, when transitioning into or out of the splice period, the packet detector 210 first detects a video packet with a PTS crossing the transition point. Upon detecting the video packet crossing the transition point, in steps 4a and 4b, the packet detector 210 notifies the splicer 230 and the feeder and re-stamper module 220 respectively in accordance with some embodiments. From this point, the splicer 230 processes or ceases to process the live TS packets in step 5a, and at the same time, the feeder and re-stamper module 220 processes or ceases to prepare the targeted content TS packets and send the prepared targeted content TS packets to the splicer 230 in step 5b.

For example, upon receiving the notification of detecting a video packet from the live TS matching a video PID crossing the transition point, the splicer 230 processes or ceases to process the live TS packets by re-stamping or ceasing to re-stamp certain video packets from the demultiplexer output buffer 125 (FIGS. 1 and 2B) while passing certain audio packets from the live TS without re-stamping. Subsequently, upon receiving the notification of detecting an audio packet from the live TS matching an audio PID crossing the transition point, the splicer 230 re-stamps or ceases to re-stamp certain audio packets from the demultiplexer output buffer 125 (FIGS. 1 and 2B). In another example, upon receiving the notification of detecting a video packet from the live TS matching a video PID crossing the transition point, the feeder and re-stamper module 220 prepares or ceases to prepare the targeted content TS packets by re-stamping or ceasing to re-stamp certain video packets from the targeted content storage 140 (FIGS. 1 and 2B). Subsequently, upon receiving the notification of detecting an audio packet from the live TS matching an audio PID crossing the transition point, the feeder and re-stamper module 220 re-stamps or ceases to re-stamp certain audio packets from the targeted content storage 140 (FIGS. 1 and 2B). In yet another example, upon receiving the notification of detecting a video or audio packet from the live TS matching a respective video or audio PID crossing the transition point, the feeder and re-stamper module 220 starts or ceases to send the prepared targeted content TS packets to the splicer 230.

In some embodiments, the splicer 230 injects the packets received from the feeder and re-stamper module 220 into the live TS and sends the processed TS packets to the chunking buffer 127 in step 6. In some embodiments, to further process the live TS, once both the video and audio live TS packets matching the video PID and audio PID respectively reach the transition point, the splicer 230 removes the live video and audio live TS packets from the viewing pipeline, e.g., re-stamping the live TS packets from the demultiplexer output buffer 125 (FIGS. 1 and 2B) with the predefined PID and removing packets with the predefined PID from the processed TS.

It should be noted that though FIG. 3 illustrates the splicer 230 as the component of injecting the re-stamped targeted content TS packets prepared by the feeder and re-stamper module 220 into the live TS and passing the processed TS to the chunking buffer 127, either the splicer 230 or the feeder and re-stamper module 220 can facilitate the generation of the processed TS. For example, the splicer 230 can pass the re-stamped live TS packets to the feeder and re-stamper module 220 to be combined with the re-stamped targeted content TS packets in order to generate the processed TS. As such, the splicer 230 and the feeder and re-stamper module 220 can be distinct, combined, or re-arranged to performed the one or more tasks of packet feeding, re-stamping, and/or injecting.

Figure 4A:
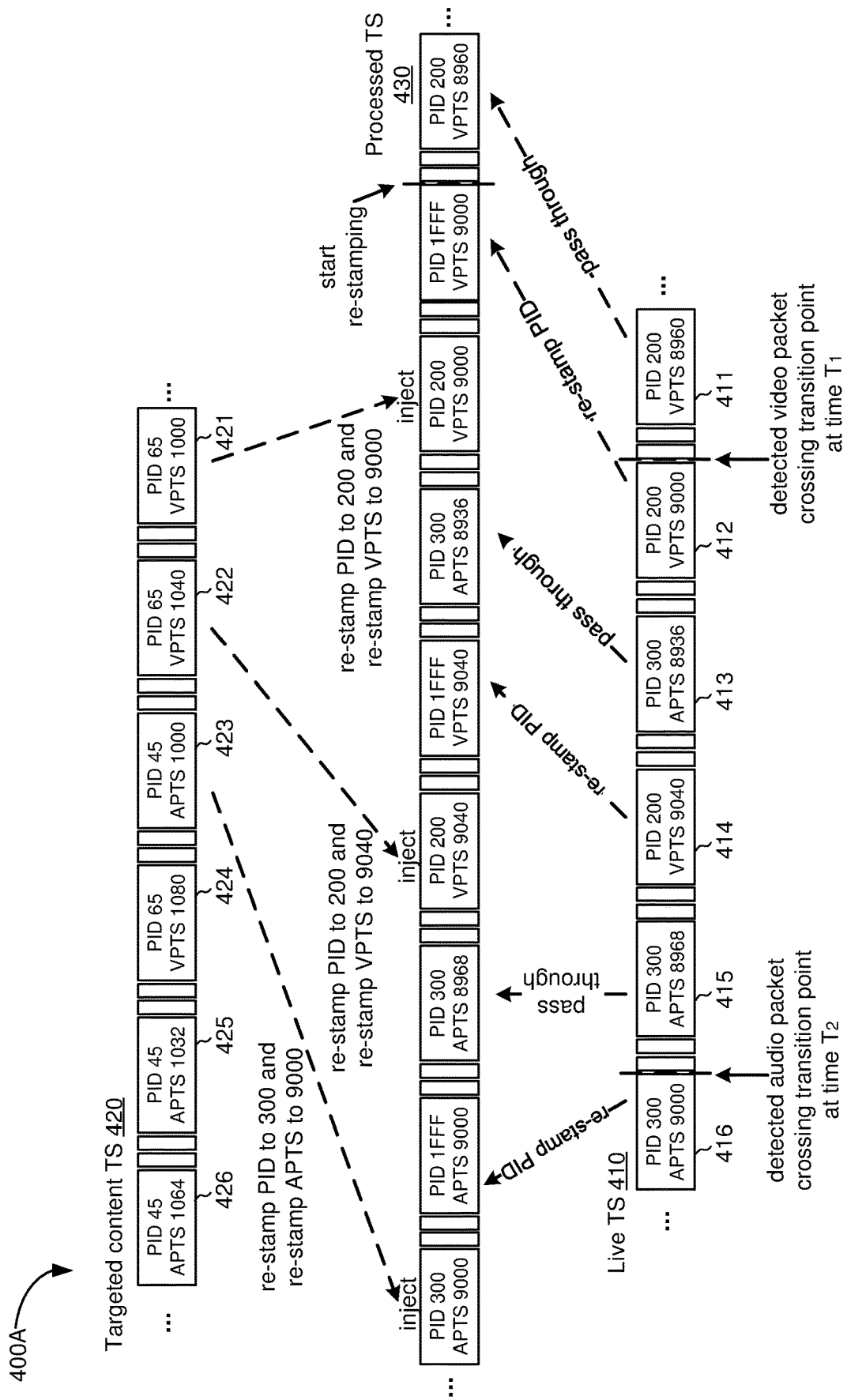
FIGS. 4A and 4B are diagrams illustrating packet processing when transitioning between live content and targeted content according to the sequence diagram shown in FIG. 3, in accordance with some embodiments.

FIG. 4A is a diagram 400A illustrating packet processing when transitioning from a live TS 410 to a targeted content TS 420 according to the sequence diagram 300 in accordance with some embodiments. In FIG. 4A, the exemplary live TS 410 includes a plurality of video packets 411-412 and 414 having a PID value of 200 and video PTS values of 8960, 9000, and 9040 respectively. The exemplary live TS 410 also includes a plurality of audio packets 413 and 415-416 having a PID value of 300 and audio PTS values of 8936, 8968, and 9000 respectively. Also as shown in FIG. 4A, the exemplary targeted content TS 420 located by the feeder and re-stamper module during targeted content TS preparation includes a plurality of video packets 421-422 and 424 having a PID value of 65 and video PTS values of 1000, 1040, and 1080 respectively. The exemplary targeted content TS 420 also includes a plurality of audio packets 423 and 425-426 having a PID value of 45 and audio PTS values of 1000, 1032, and 1064 respectively.

In some embodiments, as described above with reference to FIG. 3, when the splicer receives a splice message signaling the splice period start PTS value of 9000, the splicer notifies the packet detector to monitor the live TS 410, and the packet detector detects and notifies the splicer that at time $T_1$, video packet 412 with the video PTS value of 9000 crosses the start PTS value. In FIG. 4A, because the video packet 411 with a video PTS value of 8960 was received prior to time $T_1$, the splicer allows the video packet 411 to pass through without further processing. On the other hand, upon receiving the notification that the video packet 412 has crossed the transition point, the feeder and re-stamper module and the splicer start re-stamping the packets for packet level targeted content substitution.

In FIG. 4A, the splicer re-stamps the PID of the video packet 412 to the predefined PID, e.g., 0x1FFF. Also as shown in FIG. 4, the feeder and re-stamper module re-stamps the PID of the video packet 421 to 200, re-stamps the video PTS of the video packet 421 to 9000, and provides the re-stamped packet to the splicer so that the splicer can inject the re-stamped video packet from the targeted content TS 420 into the live TS 410. Likewise, the splicer re-stamps the PID of the video packet 414 to the predefined PID, e.g., 0x1FFF; and the feeder and re-stamper module re-stamps the PID of the video packet 422 to 200, re-stamps the video PTS of the video packet 422 to 9040, and provides the re-stamped video packet to the splicer for injection into the live TS.

In some embodiments, also as described above with reference to FIG. 3, because the video packets are transmitted ahead of the corresponding audio packets, the splicer continues to allow the audio packets 413 and 415 to pass through without re-stamping until the packet detector notifies the splicer and the feeder and re-stamper module about the audio packet 416 with the audio PTS value of 9000 crossing the transition point at time $T_2$. In some embodiments, the packet detector determines that the audio packet 416 crossed the transition point based on a determination that the audio packet 416 in the live TS 410 has the first audio frame whose PTS plus the frame duration is less than the start PTS value of 9000. It should be noted that for audio transmission, when an audio PES carries multiple audio frames, e.g., a long audio PES, the audio PES duration is calculated using the start PTS of the next audio PES. In the case of the transition points positioning within such a long audio PES, in some embodiments, the audio is trimmed based on the audio frame, so that both the audio and video TS packets of the transition points are accurately identified by the packet detector.

In response to receiving the notification, the splicer re-stamps the PID of the audio packet 416 to the predefined PID, e.g., 0x1FFF. Also in response to the notification, the feeder and re-stamper module re-stamps the PID of the audio packet 423 to 300, re-stamps the audio PTS of the audio packet 423 to 9000, and provides the re-stamped packet to the splicer so that the splicer can inject the re-stamped audio packet from the targeted content TS 420 into the live TS 410. As a result of the re-stamping and the injection, the processed TS 430 is generated and provided to the chunking buffer for filtering and decoding. In some embodiments, the splicer further removes the packets with the predefined PID from the processed TS 430 prior to sending the processed TS 430 to the chunking buffer. An exemplary processed TS without packets having the pre-defined PID (e.g., 0x1FFF) is shown in FIG. 4B.

As shown in FIG. 4A, during the transitioning into the splice period, the re-stamped presentation timestamps of the targeted content TS packets replace the live TS packets in such a way that the presentation timestamps of the injected packets are continuous from the transition point when the splice period starts. Consequently, the packet-accurate targeted content substitution described herein does not have the packet drop issues as in previously existing frame level targeted content substitution solutions, thus improving the performance and user experience when transitioning from the live TS 410 to the targeted content TS 420.

Figure 4B:
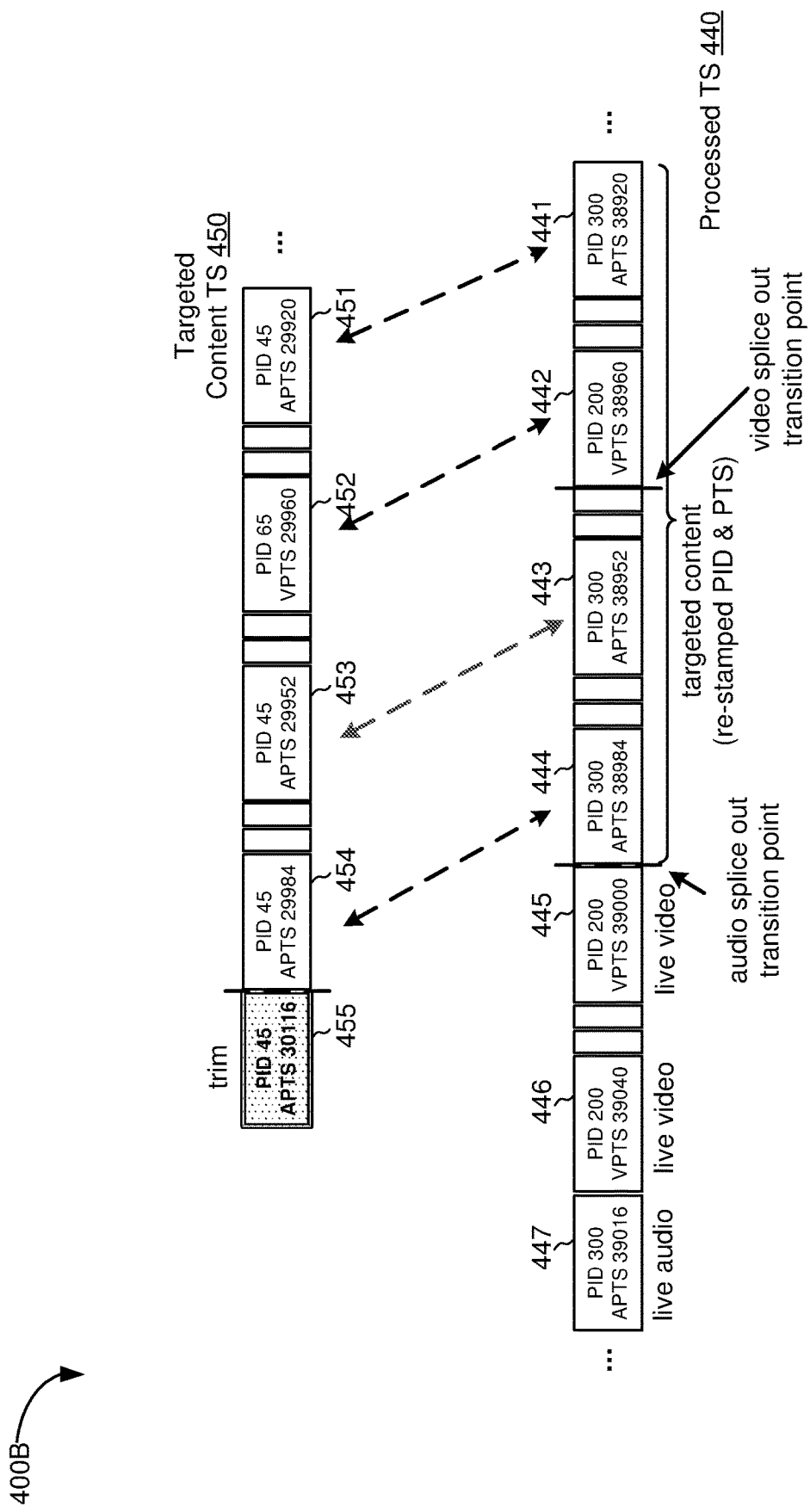

FIG. 4B is a diagram 400B illustrating packet processing when transitioning from targeted content to live content according to the sequence diagram 300 in accordance with some embodiments. In FIG. 4B, an exemplary processed TS 440 includes a plurality of packets 441-447. Different from the exemplary processed TS 430 in FIG. 4A, the splicer has removed packets with the predefined PID (e.g., 0x1FFF) from the processed TS 440 before sending the processed TS 440 to the chunking buffer. During the splice period, the PID of a video packet 452 from an exemplary targeted content TS 450 is re-stamped from to 65 to 200 when being injected to the processed TS 440 as the video packet 442; and the PIDs of audio packets 451 and 453-454 from the exemplary targeted content TS 450 are re-stamped from 45 to 300 when being injected to the processed TS 440 as the audio packets 441 and 443-454 respectively. Also as shown in FIG. 4B, the presentation timestamps of the packets 451-454 are re-stamped when being injected to the processed TS 440 as the packets 441-444 according to the methods described above with reference to FIG. 3.

In some embodiments, once the processed TS packets 441-444 within the splice period are injected to the chunking buffer, the splicer notifies the packet detector about the splice out transition point PTS, e.g., a PTS value of 38960. Upon detecting that the video packet 442 from the live TS has crossed the splice out transition point, the splice ceases re-stamping the PID of the live video TS packets after the video packet 442. As such, the video packets 445 and 446 after the video packet 442 are allowed to maintain the original PID value 200. On the other hand, the feeder and re-stamping module continues to provide re-stamped targeted content audio packets 453 and 454 until the packet detector informs the detection of the live audio packet 444 with the audio PTS value of 38984 crossing the live splice out transition point PTS. Once receiving the notification, the splicer allows both the live video and audio packets to pass through without any changes to the PID or the PTS. In FIG. 4B, the live audio packet 447 after the audio packet 444 is allowed to maintain the PID value of 300.

In some embodiments, to ensure that packets from the live TS do not overlap with any packets from the targeted content TS, the splicer trims down any additional packet(s) beyond the end time of the splice period (e.g., the splice out transition point) that are prepared and sent by the feeder and re-stamper module. For example, in FIG. 4B, an additional audio packet 455 from the targeted content TS 450 is trimmed because the audio packet 455 has a PTS value that is beyond the splice out transition point PTS.

As shown in FIG. 4B, during the transitioning out of the splice period, the re-stamping stops in such a way that the presentation timestamps of the live TS packets are continuous from the transition point when the splice period ends. Consequently, the packet-accurate targeted content substitution described herein does not have the discontinuity issues as in previously existing frame level targeted content substitution solutions, thus improving the performance and user experience when transition from the targeted content to the live content.

Figure 5:
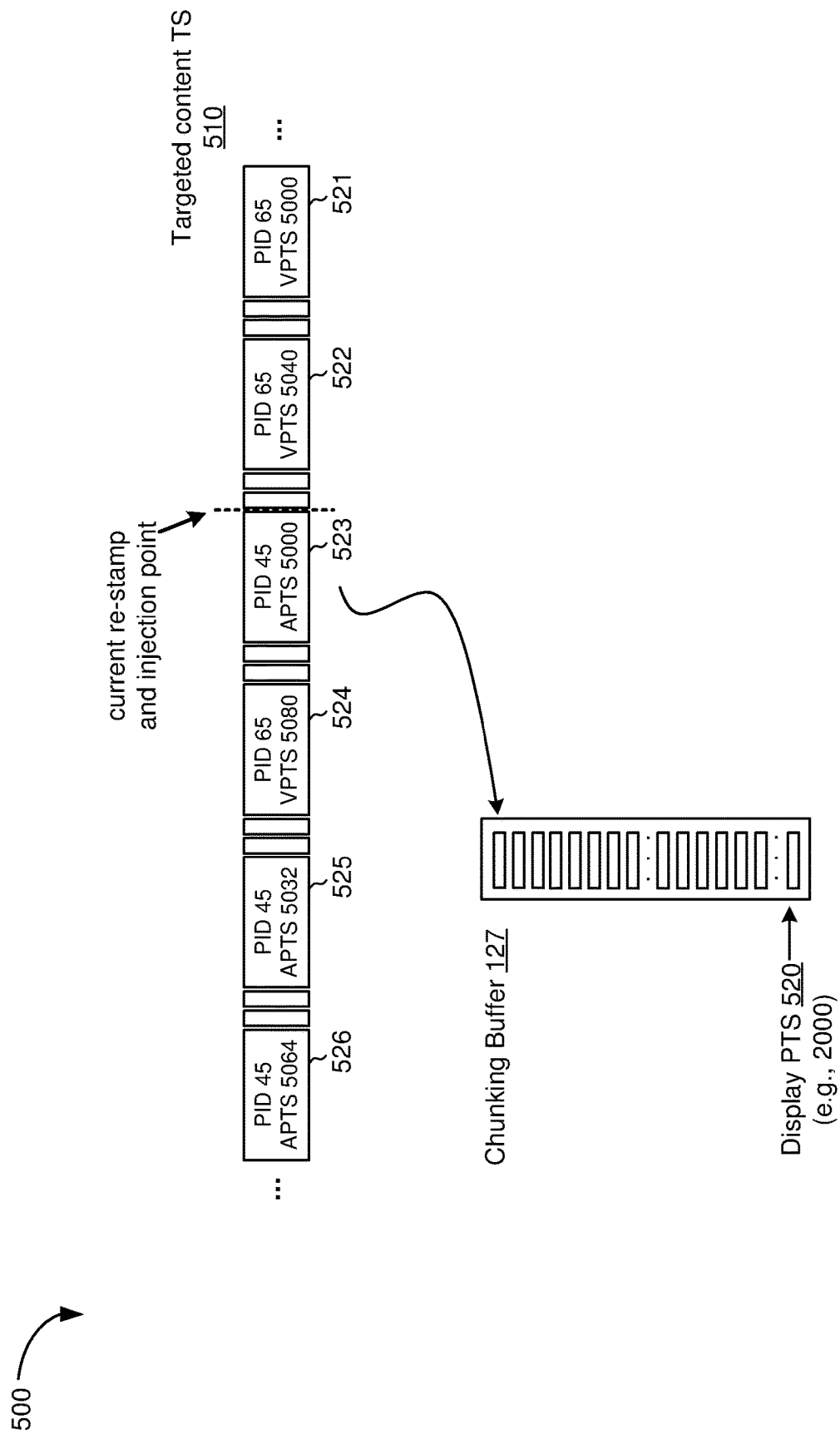
FIG. 5 is a diagram illustrating pacing the injection of targeted content TS packets, in accordance with some embodiments.

FIG. 5 is a diagram 500 illustrating pacing the injection of targeted content TS packets by the feeder and re-stamper module 220 (FIGS. 2B and 3) in accordance with some embodiments. In FIG. 5, an exemplary targeted content TS 510 includes a plurality of packets 521-526. In some embodiments, as described above with reference to FIG. 2B, the position monitor 240 monitors the current display point during transitions and while the targeted content is playing, e.g., monitoring the display PTS 520 in the chunking buffer 127 used by TS channel selector 2 123-2 and other components for decoding purposes. The position monitor 240 then uses the current display position to monitor the targeted content injection pacing.

In some embodiments, the position monitor notifies the feeder and re-stamper module of the current display PTS. Because the audio packets are encoded after the video packets, in some embodiments, the feeder and re-stamper module monitors the audio PTS and compares the current injection point of the audio PTS with the current display PTS to ensure that the difference between the current injection point of the audio PTS and the current display PTS satisfies a performance criterion. For example, in FIG. 5, the current display PTS is 2000, and the performance criterion specifies that the difference between the current injection point of the audio PTS and the current display PTS is up to 3 seconds. Accordingly, the feeder and re-stamper module checks the audio PTS of the current injection point in the targeted content TS 510 and determines that the injection of the packets from the targeted content TS 510 is up to and includes the audio packet 523, which has the audio PTS value of 5000, e.g., 5000-2000. This allows TS channel selector 2 123-2 to read not less than 3 seconds from the current display point and at the same time not too much to cause buffer overflow. In some embodiments, the performance criterion is configurable based on the projected encoder/decoder configuration.

Figure 6A:
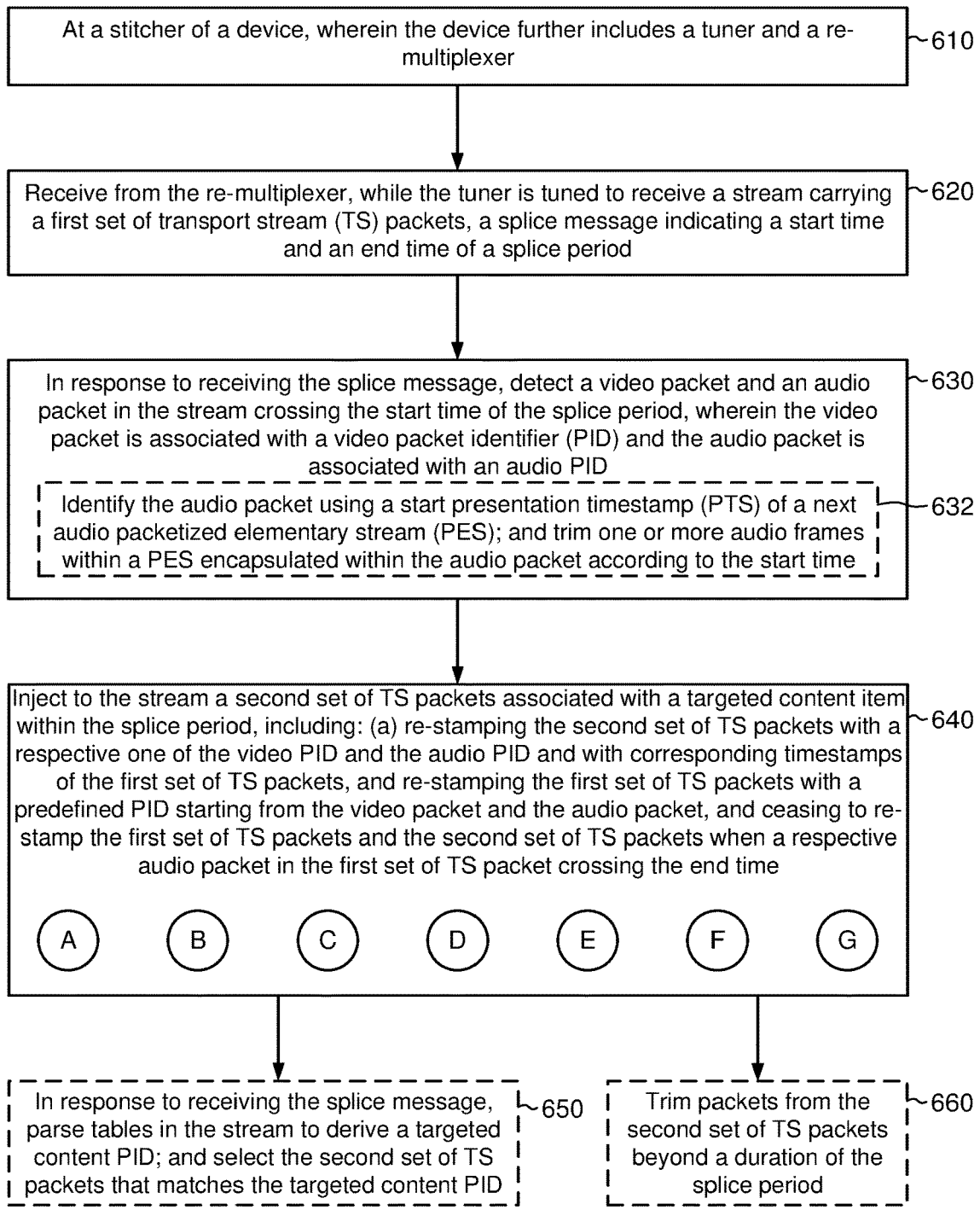

FIGS. 6A-6C are flowcharts illustrating a packet-accurate targeted content substitution method 600 in accordance with some embodiments. In some embodiments, the method 600 is performed at the client device 120 (FIG. 1) that includes at least a tuner (e.g., the tuner 122, FIG. 1), a re-multiplexer (e.g., the re-multiplexer 124, FIG. 1), and a stitcher (e.g., the stitcher 150, FIG. 1), as represented by block 610. The method 600 starts with the stitcher receiving from the re-multiplexer, while the tuner is tuned to receive a stream carrying a first set of transport stream (TS) packets, a splice message indicating a start time and an end time of a splice period, as represented by block 620. For example, in step 1 of FIG. 3, the splicer 230 receives a splice message indicating information related to the targeted content substation, such as the transition points of the splice period and the PIDs of the packets for targeted content substitution.

The method 600 continues, as represented by block 630, with the stitcher in response to receiving the splice message, detecting a video packet and an audio packet in the stream crossing the start time of the splice period, where the video packet is associated with a video packet identifier (PID) and the audio packet is associated with an audio PID. For example, in step 2a of FIG. 3, the splicer 230 informs the packet detector 210 the transition points, such as a start PTS of the splice period, so that the packet detector 210 can monitor the video and audio PIDs referenced in the splice message in step 3 and look for the video packet and the audio packet in the live TS that would cross the start PTS. In some embodiments, as represented by block 632, in the case of a long PES encapsulated in an audio packet, detecting the video packet and the audio packet in the stream crossing the start time of the splice period includes identifying the audio packet using a start presentation timestamp (PTS) of a next audio packetized elementary stream (PES), and trimming one or more audio frames within a PES encapsulated within the audio packet according to the start time. In other words, in the case of the transition points lie within an audio PES that carry multiple audio frames, the audio would be cut based on the audio frame so that both audio and video TS packets of the transition points are accurately identified by a packet detector during the transition.

Still referring to FIG. 6A, the method 600 continues, as represented by block 640, with the stitcher injecting to the stream a second set of TS packets associated with a targeted content item within the splice period, including re-stamping the second set of TS packets with a respective one of the video PID and the audio PID and with corresponding timestamps of the first set of TS packets, and re-stamping the first set of TS packets with a predefined PID starting from the video packet and the audio packet, and ceasing to re-stamp the first set of TS packets and the second set of TS packets when a respective presentation timestamp of a respective audio packet in the first set of TS packets crossing the end time. Various embodiments of the injecting and re-stamping are further described with reference to FIGS. 6B and 6C.

In some embodiments, as represented by block 650, the method 600 further includes in response to receiving the splice message, parsing tables in the stream to derive a targeted content PID; and selecting the second set of TS packets that matches the targeted content PID. For example, in FIG. 3, as soon as receiving the splice message, the splicer 230 notifies the feeder and re-stamper module 220 in step 2b to prepare the targeted content in advance, such as parsing PAT and PMT from the live stream and selecting packets with video PID and audio PID matching the targeted content PIDs.

In some embodiments, to ensure that the targeted content TS packets and the live content TS packets do not overlap, as represented by block 660, the method 600 further includes trimming packets from the second set of TS packets beyond a duration of the splice period. For example, in FIG. 4B, the additional audio packet 455 from the targeted content TS 450 is trimmed because the audio packet 455 has a PTS value that is beyond the splice out transition point PTS.

Turning to FIG. 6B, as represented by block 641, in some embodiments, detecting the video packet and the audio packet in the stream crossing the start time of the splice period includes detecting a video PTS of the video packet crossing the start time; and re-stamping the second set of TS packets includes re-stamping PIDs of video packets in the second set of TS packets to the video PID and re-stamping presentation timestamps of the video packets continuous to the video PTS of the video packet without re-stamping the audio packets in the second set of TS packets. For example, in FIG. 4A, the video packet 412 from the live TS 410 has the video PTS value of 9000 and the PID value of 200. At time $T_1$, the PTS of the video packet 412 is first detected crossing the transition point. From time $T_1$, following steps 5a and 5b in FIG. 3, the splicer receives both live TS packets and targeted content packets from the feeder and re-stamper module. Also as shown in FIG. 4A, the PID of the targeted content TS packet 421 is mapped to the PID of the video packet 412 and the PTS of the targeted content TS packet 421 is re-stamped to the PTS of the video packet 412. Accordingly, once the re-stamped targeted content TS packet 421 is injected into the processed TS 430, the re-stamped targeted content TS packet 421 replaces the live TS packet 412 and is a continuation of the live TS packet 411 from the transition point. Also in FIG. 4A, following time $T_1$ but before detecting the live audio TS packet 416 crossing the transition point at time $T_2$, live audio TS packets 413 and 415 are passed through without being re-stamped before being placed in the chunking buffer as part of the processed TS 430.

In some embodiments, as represented by block 642, detecting the video packet and the audio packet in the stream crossing the start time of the splice period includes detecting an audio PTS of the audio packet crossing the start time; and re-stamping the second set of TS packets includes re-stamping PIDs of audio packets in the second set of TS packets to the audio PID and re-stamping presentation timestamps of the audio packets continuous to the audio PTS of the audio packet. For example, as shown in FIG. 4A, the audio TS packet 416 has a PID value of 300 and an audio PTS value of 9000. Following the detection of the video TS packet 412 crossing the transition point at time $T_1$, at time $T_2$, the packet detector detects that the PTS of the audio packet 416 crosses the transition point. From time $T_2$, both the video and audio TS packets are re-stamped. In FIG. 4A, the PID of the targeted content audio TS packet 423 is mapped to the PID of the audio packet 416 and the PTS of the targeted content TS audio packet 423 is re-stamped to the PTS of the audio packet 416.

In some embodiments, as represented by block 643, ceasing to re-stamp the first set of TS packets and the second set of TS packets includes detecting a respective video TS packet in the first set of TS packets crossing the end time; and in response to detecting the respective video TS packet crossing the end time, ceasing to re-stamp video packets in the first set of TS packets to the predefined PID after the respective video TS packet while continuing to re-stamp one or more audio packets in the first set of TS packets to the predefined PID. For example, in step 2a of FIG. 3, the splicer 230 informs the packet detector 210 to detect the live TS re-join point, e.g., the end time of the splice period. The packet detector 210, upon receiving the notification, monitors the PTS of the live TS packet in step 3. As shown in FIG. 4B, once the video packet 442 crosses the splice out transition, the video packets 446 after the video packet 442 are allowed to keep the original video PID value 200 and the live audio TS packets alone are re-stamped with the predefined PID until the audio PTS of the audio packet 444 crosses the splice out transition point.

In some embodiments, as represented by block 644, ceasing to re-stamp the first set of TS packets and the second set of TS packets includes detecting the respective audio packet in the first set of TS packets crossing the end time; and in response to detecting the respective audio TS packet crossing the end time, ceasing to re-stamp audio packets in the first set of TS packets to the predefined PID after the respective audio TS packet and ceasing to inject the second set of TS packets to the stream. For example, in FIG. 4B, after detecting the audio packet 444 crossing the audio splice out transition point, the audio packet 447 following the audio packet 444 is allowed to maintain the original PID value of 300 from the live stream, and the targeted content TS packets are no longer injected into the live TS after the end of the splice period.

Turning to FIG. 6C, in some embodiments, as represented by block 645, injecting to the stream the second set of TS packets associated with the targeted content item within the splice period includes injecting up to a threshold amount of the second set of TS packets into the stream based on a last injected audio PTS and a current display timestamp. For example, in FIG. 5, the target content TS packets 521-526 are re-stamped and injected to the live TS to form a processed TS so that packets form the processed TS are sent to the chunking buffer 127 in a paced manner. Also as shown in FIG. 5, the current re-stamp and injection point of the last re-stamped and injected audio TS packet 523 is compared with the current display PTS so that no more than a threshold amount of the packets are pushed to the chunking buffer 127. In such embodiments, as represented by block 646, the stitcher is further configured to start tracking the current display timestamp in response to receiving the splice message and end tracking the current display timestamp once the respective presentation timestamp of the respective audio packet in the first set of TS packets crosses the end time. As such, in FIG. 2B, the position monitor 240 keeps track of the current display point during the transitioning into the targeted content display and while the targeted content is displayed, and ends the tracking during the live viewing mode as shown in FIG. 2A.

In some embodiments, as represented by block 647, ceasing to re-stamp the first set of TS packets and the second set of TS packets includes passing without re-stamping packets of the stream to a chunking buffer of the device, including maintaining PIDs of the packets, wherein the chunking buffer is coupled to the stitcher. For example, in the live viewing mode as shown in FIG. 2A, the stitcher 150 passes the live TS coming from the demultiplexer output buffer 125 to the chunking buffer 127 without activating the packet detection by the packet detector 210 (FIG. 2B), the re-stamping by the feeder and re-stamper module 220 (FIG. 2B) and/or the splicer 230 (FIG. 2B), or the current display PTS monitoring by the position monitor 240 (FIG. 2B). As such, in the live viewing mode, the stitcher 150 introduces minimal delays to the live data viewing pipeline.

In some embodiments, as represented by block 648, injecting to the stream the second set of TS packets associated with the targeted content item within the splice period includes removing packets in the stream having the predefined PID before forwarding the stream to a chunking buffer of the device. For example, in FIG. 4A, the PIDs of the packets 412-416 from the live TS 410 after the transition points are re-stamped to 0x1FFF. In the example shown in FIG. 4B, the splicer removes packets with the PID value 0x1FFF so that the exemplary processed TS 440 does not have packets with the predefined PID value 0x1FFF before being sent to the chunking buffer.

Figure 7:
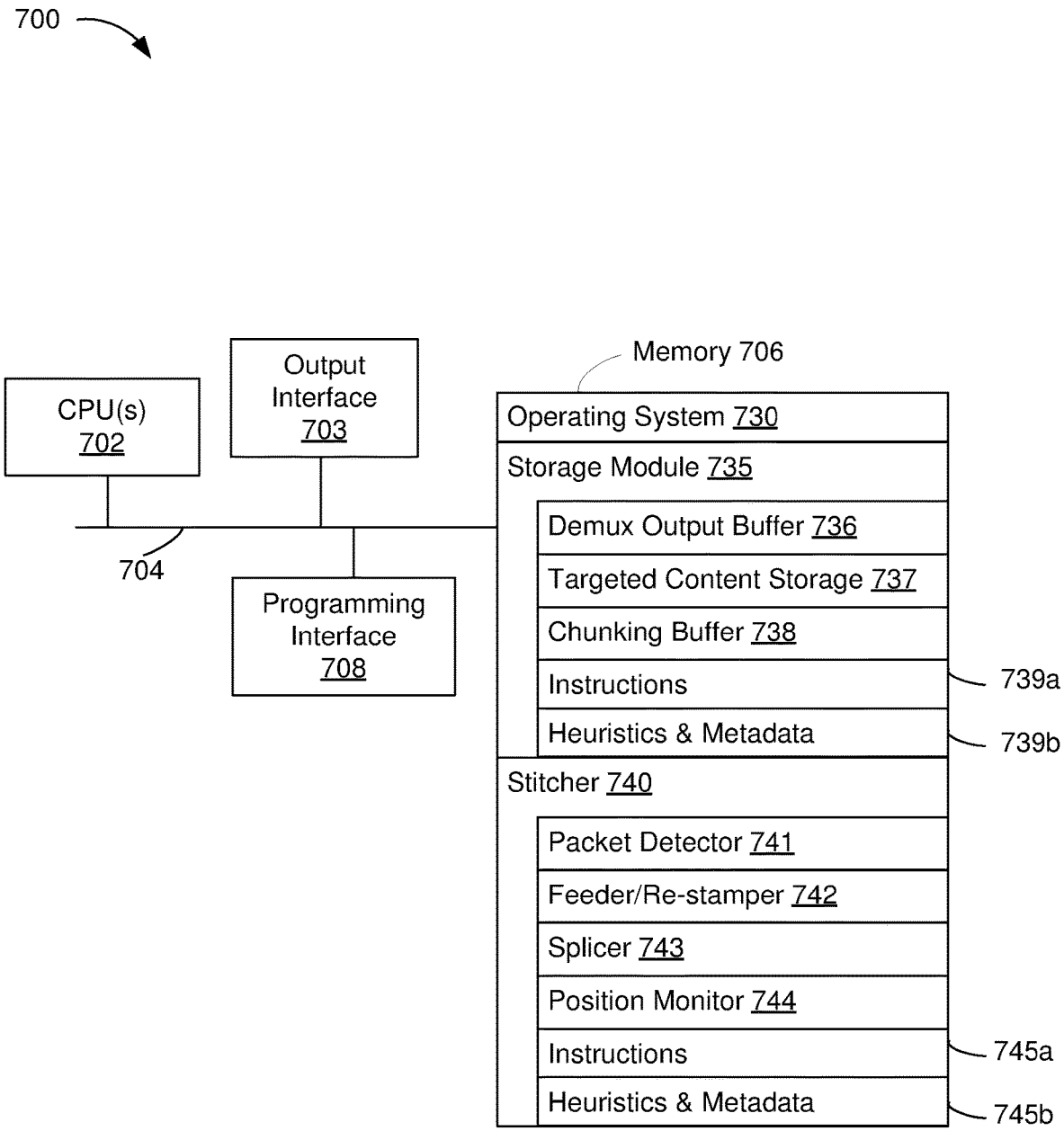
FIG. 7 is a block diagram of a computing device for performing the packet-accurate targeted content substitution, in accordance with some embodiments.

FIG. 7 is a block diagram of a computing device 700 for performing packet-accurate targeted content substitution in accordance with some embodiments. In some embodiments, the computing device 700 corresponds to one or more components of the client device 120 in FIG. 1 and performs one or more of the functionalities described above with respect to the client device. In particular, the computing device 700 performs one or more of the functionalities described above with respect to the stitcher 150 shown in FIGS. 1 and 2B. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 700 includes one or more processing units (CPU's) 702 (e.g., processors and/or controllers), one or more output interfaces 703 (e.g., one or more network interfaces), a memory 706, a programming interface 708, and one or more communication buses 704 for interconnecting these and various other components.

In some embodiments, the communication buses 704 include circuitry that interconnects and controls communications between system components. The memory 706 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some embodiments, the memory 706 or the non-transitory computer readable storage medium of the memory 706 stores the following programs, modules and data structures, or a subset thereof including an optional operating system 730, a storage module 735, and a stitcher 740. In some embodiments, one or more instructions are included in a combination of logic and non-transitory memory. The operating system 730 includes procedures for handling various basic system services and for performing hardware dependent tasks.

In some embodiments, the storage module 735 is configured to store media content used by, processed by, and/or outputted by the stitcher 740. In some embodiments, the storage module 735 includes a demultiplexer output buffer 736 (e.g., the demultiplexer output buffer 125 in FIGS. 1 and 2A-2B) for storing and providing the demultiplexed live streams to the stitcher 740, a targeted content storage 737 (e.g., the targeted content storage 140 in FIGS. 1 and 2B) for storing and providing targeted content streams to the stitcher 740, and a chunking buffer 738 (e.g., the chunking buffer 127 in FIGS. 1, 2A-2B, 3, and 5) for storing and receiving processed streams from the stitcher 740. To that end, the storage module 735 includes a set of instructions 739a and heuristics and metadata 739b.

In some embodiments, the stitcher 740 (e.g., the stitcher 150, FIGS. 1 and 2A-2B) is configured to stitch targeted content to live content at packet level. In some embodiments, the stitcher 740 further includes a packet detector 741 (e.g., the packet detector 210 in FIGS. 2B and 3) to monitor the demultiplexer output buffer 736 and notify a splicer 743 and/or a feeder and re-stamper module 742 to start or stop injecting targeted content, the feeder and re-stamper module 742 (e.g., the feeder and re-stamper module 220 in FIGS. 2B and 3) for obtaining targeted content from the targeted content storage 737, the splicer 743 (e.g., the splicer 230 in FIGS. 2B and 3) for receiving the signaling information and notifies the packet detector 741 to monitor the demultiplexer output buffer 736, and a position monitor 744 (e.g., the position monitor 240 in FIGS. 2B and 3) to coordinate with the feeder and re-stamper module 742 to pace the bitrate of the targeted content injection. To that end, the stitcher 740 includes a set of instructions 745*a* and heuristics and metadata 745*b*.

Although the storage model 735 and the stitcher 740 are illustrated as residing on a single computing device 700, it should be understood that in other embodiments, any combination of the storage model 735 and the stitcher 740 can reside in separate computing devices in various embodiments. For example, in some embodiments, each of the storage model 735 and the stitcher 740 resides on a separate computing device.

Moreover, FIG. 7 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at a stitcher of a device, wherein the device further includes a tuner and a re-multiplexer:
receiving from the re-multiplexer, while the tuner is tuned to receive a stream carrying a first set of transport stream (TS) packets, a splice message indicating a start time and an end time of a splice period;
in response to receiving the splice message, detecting a video packet and an audio packet in the stream crossing the start time of the splice period, wherein the video packet is associated with a video packet identifier (PID) and the audio packet is associated with an audio PID; and
injecting to the stream a second set of TS packets associated with a targeted content item within the splice period, including:
re-stamping the second set of TS packets with a respective one of the video PID and the audio PID and with corresponding timestamps of the first set of TS packets, and re-stamping the first set of TS packets with a predefined PID starting from the video packet and the audio packet, and;
ceasing to re-stamp the first set of TS packets and the second set of TS packets when a respective audio packet in the first set of TS packets crosses the end time.

2. The method of claim 1, wherein detecting the video packet and the audio packet in the stream crossing the start time of the splice period includes:
identifying the audio packet using a start presentation timestamp (PTS) of a next audio packetized elementary stream (PES); and
trimming one or more audio frames within a PES encapsulated within the audio packet according to the start time.

3. The method of claim 1, further comprising, in response to receiving the splice message:
parsing tables in the stream to derive a targeted content PID; and
selecting the second set of TS packets that matches the targeted content PID.

4. The method of claim 1, further comprising:
trimming packets from the second set of TS packets beyond a duration of the splice period.

5. The method of claim 1, wherein:
detecting the video packet and the audio packet in the stream crossing the start time of the splice period includes detecting a video PTS of the video packet crossing the start time; and re-stamping the second set of TS packets includes re-stamping PIDs of video packets in the second set of TS packets to the video PID and re-stamping presentation timestamps of the video packets continuous to the video PTS of the video packet without re-stamping the audio packets in the second set of TS packets.

6. The method of claim 1, wherein:

detecting the video packet and the audio packet in the stream crossing the start time of the splice period includes detecting an audio PTS of the audio packet crossing the start time; and re-stamping the second set of TS packets includes re-stamping PIDs of audio packets in the second set of TS packets to the audio PID and re-stamping presentation timestamps of the audio packets continuous to the audio PTS of the audio packet.

7. The method of claim 1, wherein ceasing to re-stamp the first set of TS packets and the second set of TS packets includes:

detecting a respective video TS packet in the first set of TS packets crossing the end time; and in response to detecting the respective video TS packet crossing the end time, ceasing to re-stamp video packets in the first set of TS packets to the predefined PID after the respective video TS packet while continuing to re-stamp one or more audio packets in the first set of TS packets to the predefined PID.

8. The method of claim 1, wherein ceasing to re-stamp the first set of TS packets and the second set of TS packets includes:

detecting the respective audio packet in the first set of TS packets crossing the end time; and in response to detecting the respective audio TS packet crossing the end time, ceasing to re-stamp audio packets in the first set of TS packets to the predefined PID after the respective audio TS packet and ceasing to inject the second set of TS packets to the stream.

9. The method of claim 1, wherein injecting to the stream the second set of TS packets associated with the targeted content item within the splice period includes:

injecting up to a threshold amount of the second set of TS packets into the stream based on a last injected audio PTS and a current display timestamp.

10. The method of claim 9, wherein the stitcher is further configured to start tracking the current display timestamp in response to receiving the splice message and end tracking the current display timestamp once the respective audio packet in the first set of TS packets crosses the end time.

11. The method of claim 1, wherein ceasing to re-stamp the first set of TS packets and the second set of TS packets includes:

passing without re-stamping packets of the stream to a chunking buffer of the device, including maintaining PIDs of the packets, wherein the chunking buffer is coupled to the stitcher.

12. The method of claim 1, wherein injecting to the stream the second set of TS packets associated with the targeted content item within the splice period includes:

removing packets in the stream having the predefined PID before forwarding the stream to a chunking buffer of the device.

13. A non-transitory memory storing one or more programs, which, when executed by a stitcher of a device, wherein the device further includes a tuner and a re-multiplexer, cause the device to:

receive from the re-multiplexer, while the tuner is tuned to receive a stream carrying a first set of transport stream (TS) packets, a splice message indicating a start time and an end time of a splice period;

in response to receiving the splice message, detect a video packet and an audio packet in the stream crossing the start time of the splice period, wherein the video packet is associated with a video packet identifier (PID) and the audio packet is associated with an audio PID; and inject to the stream a second set of TS packets associated with a targeted content item within the splice period, including:

re-stamping the second set of TS packets with a respective one of the video PID and the audio PID and with corresponding timestamps of the first set of TS packets, and re-stamping the first set of TS packets with a predefined PID starting from the video packet and the audio packet, and;

ceasing to re-stamp the first set of TS packets and the second set of TS packets when a respective audio packet in the first set of TS packets crosses the end time.

14. The non-transitory memory of claim 13, wherein:

detecting the video packet and the audio packet in the stream crossing the start time of the splice period includes detecting a video PTS of the video packet crossing the start time; and re-stamping the second set of TS packets includes re-stamping PIDs of video packets in the second set of TS packets to the video PID and re-stamping presentation timestamps of the video packets continuous to the video PTS of the video packet without re-stamping the audio packets in the second set of TS packets.

15. The non-transitory memory of claim 13, wherein:

detecting the video packet and the audio packet in the stream crossing the start time of the splice period includes detecting an audio PTS of the audio packet crossing the start time; and re-stamping the second set of TS packets includes re-stamping PIDs of audio packets in the second set of TS packets to the audio PID and re-stamping presentation timestamps of the audio packets continuous to the audio PTS of the audio packet.

16. The non-transitory memory of claim 13, wherein ceasing to re-stamp the first set of TS packets and the second set of TS packets includes:

detecting a respective video TS packet in the first set of TS packets crossing the end time; and in response to detecting the respective video TS packet crossing the end time, ceasing to re-stamp video packets in the first set of TS packets to the predefined PID after the respective video TS packet while continuing to re-stamp one or more audio packets in the first set of TS packets to the predefined PID.

17. The non-transitory memory of claim 13, wherein ceasing to re-stamp the first set of TS packets and the second set of TS packets includes:

detecting the respective audio packet in the first set of TS packets crossing the end time; and in response to detecting the respective audio TS packet crossing the end time, ceasing to re-stamp audio packets in the first set of TS packets to the predefined PID after the respective audio TS packet and ceasing to inject the second set of TS packets to the stream.

18. The non-transitory memory of claim 13, wherein injecting to the stream the second set of TS packets associated with the targeted content item within the splice period includes:
   injecting up to a threshold amount of the second set of TS packets into the stream based on a last injected audio PTS and a current display timestamp.

19. The non-transitory memory of claim 13, wherein ceasing to re-stamp the first set of TS packets and the second set of TS packets includes:
   passing without re-stamping packets of the stream to a chunking buffer of the device, including maintaining PIDs of the packets, wherein the chunking buffer is coupled to the stitcher.

20. A device comprising:
   a tuner operable to tune to signals carrying multiplexed streams;
   a re-multiplexer operable to re-multiplex the multiplexed streams; and
   a stitcher operable to:
      receive from the re-multiplexer, while the tuner is tuned to receive a stream carrying a first set of transport stream (TS) packets, a splice message indicating a start time and an end time of a splice period;
      in response to receiving the splice message, detect a video packet and an audio packet in the stream crossing the start time of the splice period, wherein the video packet is associated with a video packet identifier (PID) and the audio packet is associated with an audio PID; and
      inject to the stream a second set of TS packets associated with a targeted content item within the splice period, including:
         re-stamping the second set of TS packets with a respective one of the video PID and the audio PID and with corresponding timestamps of the first set of TS packets, and re-stamping the first set of TS packets with a predefined PID starting from the video packet and the audio packet, and;
         ceasing to re-stamp the first set of TS packets and the second set of TS packets when a respective audio packet in the first set of TS packets crosses the end time.

* * * * *